Jan. 17, 1939.                R. ABRAMS                2,144,477
                        ARMATURE WINDING MACHINE
                    Filed Sept. 28, 1937      3 Sheets-Sheet 1

INVENTOR
R. Abrams
BY [signature]
ATTORNEY

Jan. 17, 1939.  R. ABRAMS  2,144,477
ARMATURE WINDING MACHINE
Filed Sept. 28, 1937  3 Sheets-Sheet 3
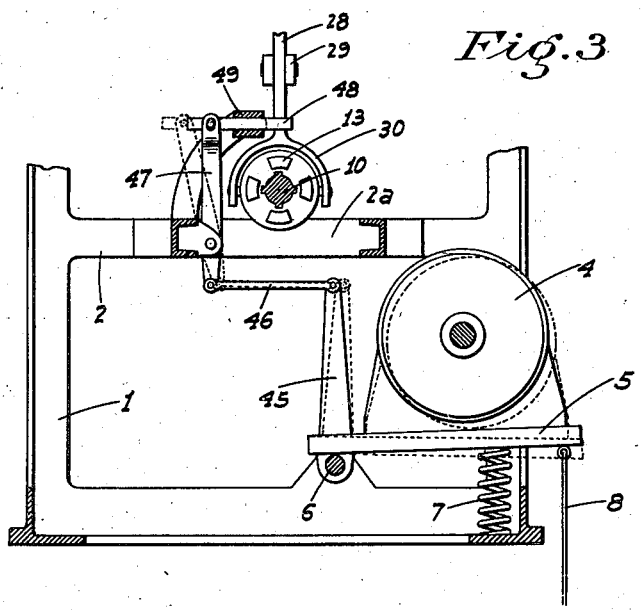
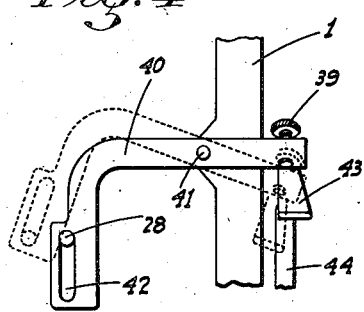
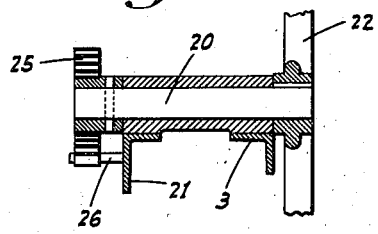
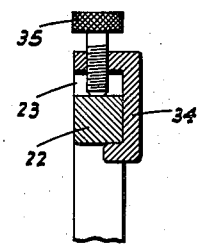
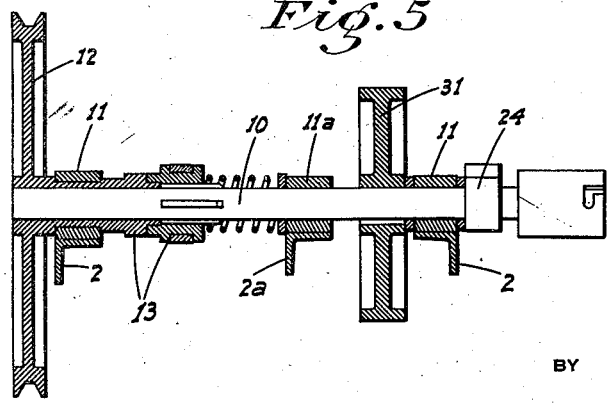
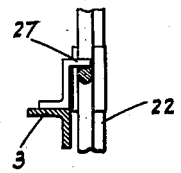
INVENTOR
R. Abrams
BY
ATTORNEY Patented Jan. 17, 1939

2,144,477

UNITED STATES PATENT OFFICE 2,144,477

ARMATURE WINDING MACHINE

Ralph Abrams, Fresno, Calif.

Application September 28, 1937, Serial No. 166,106

6 Claims. (Cl. 242—13)

This invention relates generally to an armature winding machine and in particular the invention relates to a control mechanism for an armature winding head.

The principal object of my invention is to provide a control mechanism for an armature winding head, the mechanism being so arranged as to provide for the selective control of the number of revolutions of the head and particularly that type of head used to wind drum armatures having open slotted cores.

An additional object of my invention is to provide a control mechanism, for armature winding heads, provided with clutch and brake assemblies arranged so that when the winding head has revolved the selected number of revolutions, the clutch will be released and the brake applied whereby to prevent over-running of the winding head relative to the wire feed.

A further object of the invention is to provide a control mechanism, for armature winding heads, which will automatically return to its initial or starting position upon completion of the winding cycle and the winding of one coil of a drum armature.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a fragmentary transverse section on line 3—3 of Fig. 1.

Figure 4 is a fragmentary top plan showing the clutch throw-out arm.

Figure 5 is a sectional elevation of the driven shaft assembly.

Figure 6 is a sectional elevation of the ratchet wheel shaft assembly.

Figure 7 is a cross section taken on line 7—7 of Fig. 2.

Figure 8 is a cross section taken on line 8—8 of Fig. 2.

Figure 1:
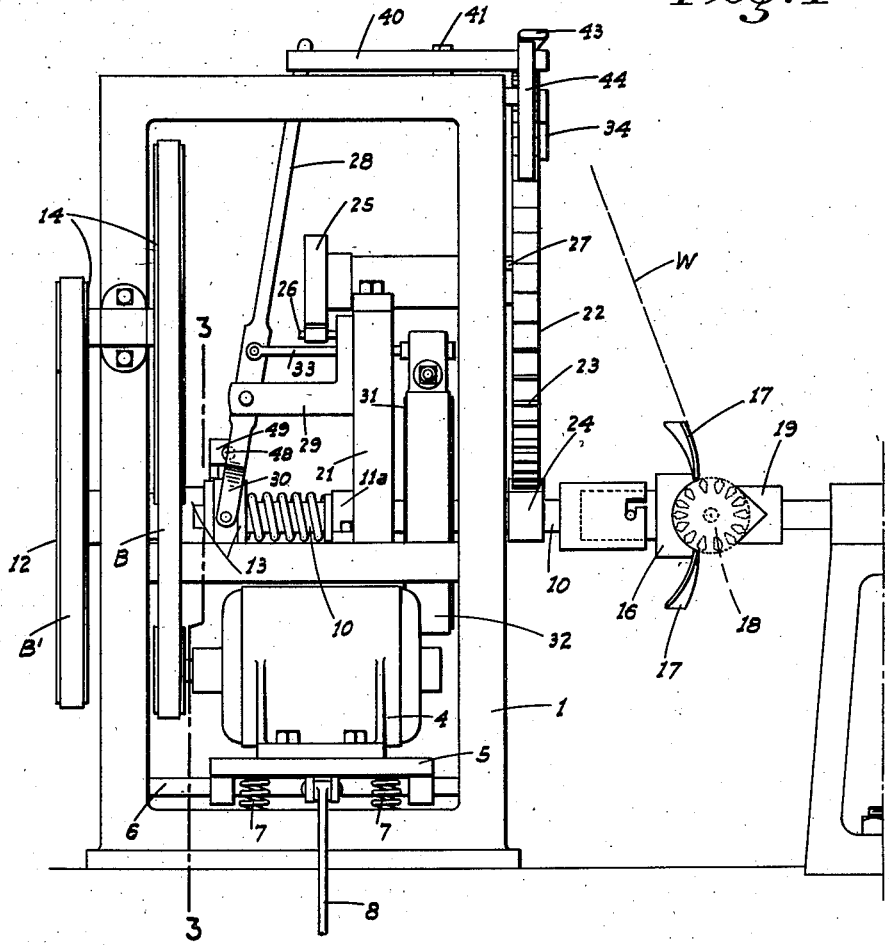
Figure 1 is a front elevation of the structure.

Referring now more particularly to the characters of reference on the drawings, the numeral 1 indicates an open, upstanding supporting frame of substantially rectangular configuration and including, on each side, lower cross members 2 and upper cross members 3. An electric motor 4 is mounted on a base 5. The base is pivoted at its inner edge on a shaft 6 and is supported intermediate its inner and outer edges on spaced compression springs 7. The outer edge of the base extends beyond frame 1 and is connected by a rod 8 with a hinged floor pedal 9.

A shaft 10 extends between cross members 2 and projects at both ends some distance beyond the frame 1, journals 11 rotatably mounting the shaft in place. An intermediate cross member 2a carries an additional journal 11a. The shaft 10, at one end, is provided with a pulley 12 turnable thereon but arranged for driving connection with the shaft through a spring engaged clutch assembly 13. The pulley is driven at slow speed from motor 4 by means of endless belts B and B' and a speed reduction assembly indicated generally at 14.

Figure 9:
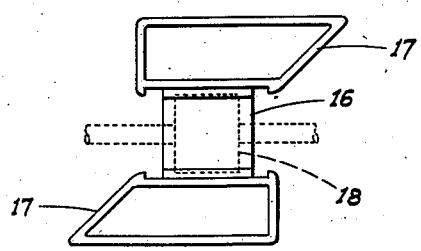
Figure 9 is an end view of the winding head.
Figure 2:
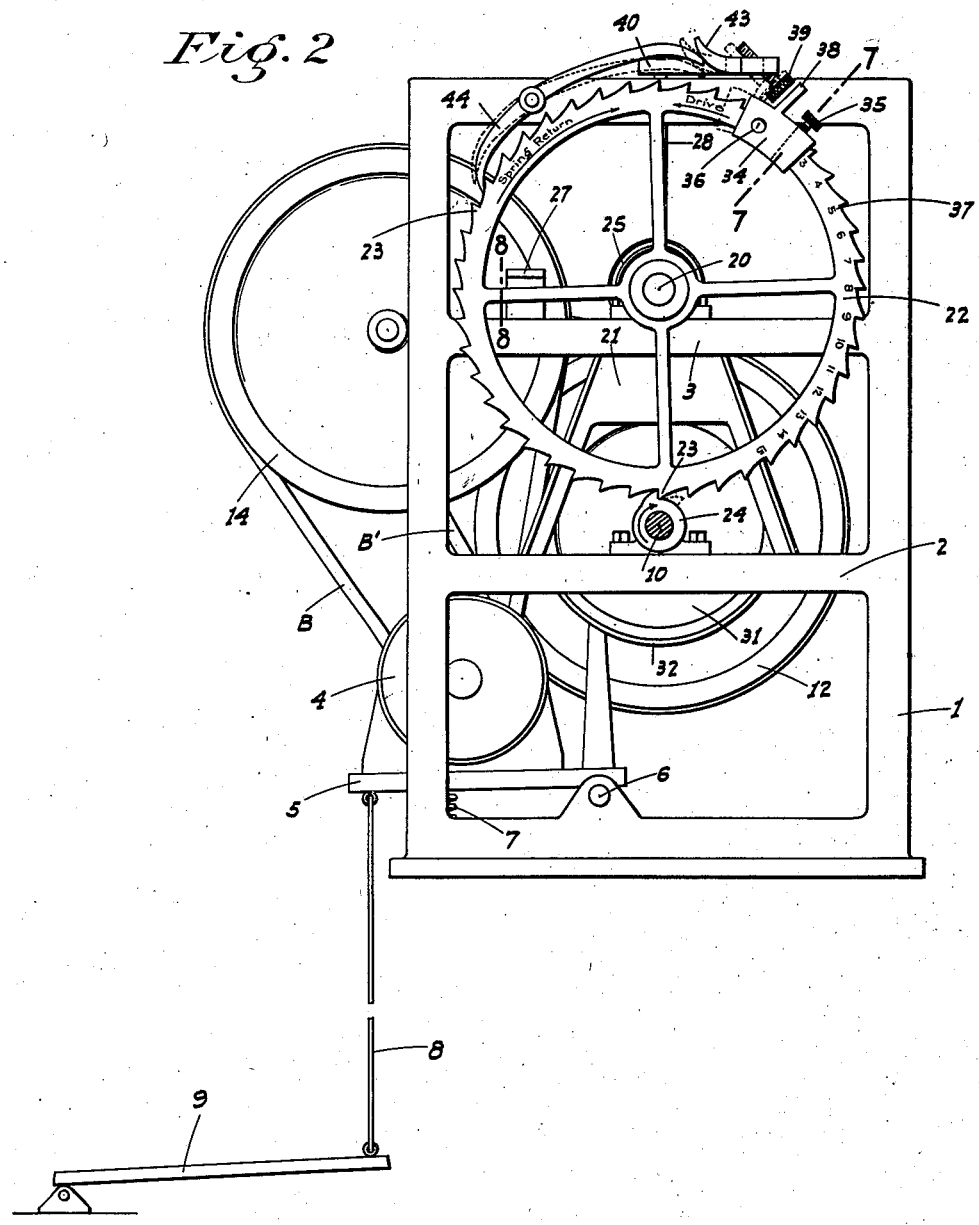
Figure 2 is an end elevation of the structure.

At its other end the shaft is provided with a chuck 15 to removably receive an armature winding head 16 having opposed wire guiding fins 17 (shown in Figs. 1 and 9) projecting therefrom whereby to guide wire W from a tension device (not shown) to the slotted core of an armature 18 secured transversely of the axis of shaft 10 and between the head 16 and a releasable and turnable presser head 19 mounted in a suitable manner. The armature winding head 16, fins 17, and presser head 19 are of usual construction and operation.

Another shaft 20, disposed above but parallel to shaft 10, is journaled between one upper cross member 3 and a vertical supporting member 21. At its outer end shaft 20 extends beyond frame 1, a relatively large ratchet wheel 22 being fixed on the shaft outwardly of the frame. The ratchet teeth 23 when adjacent shaft 10 point in a direction opposite to the direction of rotation of said shaft. A tooth engaging drive cam 24 is fixed on shaft 10 in alinement with wheel 22 and is arranged, with rotation of shaft 10, to intermittently and consecutively engage the teeth 23 and turn wheel 22 through a certain arc. A coil spring 25 surrounds the inner end of shaft 20, the inner end of the spring being fixed on the shaft and the outer end fixed on a pin 26 projecting from supporting member 21. The spring is under some tension at all times and tends to rotate wheel 22 in the same direction as shaft 10 rotates. A stop 27 is mounted on the upper cross member 3 adjacent wheel 22 and is disposed in such position as to engage one spoke of the wheel and normally hold said wheel in a zero or starting position against the tension of spring 25 as will hereinafter appear.

An upstanding lever 28 is pivoted intermediate its ends on a horizontal arm 29 which projects from supporting member 21. The lower end of the lever carries a clutch actuating fork 30 cooperatively engaged with clutch assembly 13, while the upper end of the lever projects above the top of the main frame. A brake drum 31 is fixed on shaft 10 and is provided with a brake band assembly 32 of common type. A horizontal actuating rod 33 is operatively connected at one end to the brake band assembly and at the other end is pivoted on the lever 28 above its pivot. The brake is applied when rod 33 is drawn in a direction away from the assembly 32.

A slide block 34 is adjustably mounted on the ratchet wheel by a thumb screw 35, the slide block having a sight opening 36 for selective register with numbers 37 which consecutively identify the ratchet teeth 23 about a portion of the perpihery of the wheel. The slide is formed with a rigid outwardly projecting finger 38 adapted to engage with an adjustable stop 39 on the adjacent leg of an L shaped lever 40 pivoted at 41 on top of the main frame in a horizontal position. The other leg of the lever 40 extends substantially at right angles to lever 28 and is slotted, as at 42, and the upper end of lever 28 rides in said slot. A cam 43 is carried on lever 40 adjacent stop 39 and is arranged, with proper movement of lever 40, to engage and release a pivoted holding pawl 44 which normally engages with ratchet teeth 23.

A rigid arm 45 projects upwardly from the inner portion of motor base 5 and is connected at its upper end with a pivoted link 46, the other end of the link being connected to the lower end of an upstanding lever 47 which is pivoted intermediate its ends on the frame. The upper end of lever 47 carries a horizontal locking pin 48 slidably supported as at 49 and arranged to normally project into the path of clutch yoke end of lever 28 and hold the lever in a clutch disengaging position. With lever 28 thus normally held in a clutch releasing position, brake band assembly 32 is in braking position, and lever 40 is in a pawl releasing position, and ratchet wheel 22 is held in zero or starting position by stop 27, that is, the numbered teeth of the ratchet wheel are then in predetermined position relative to the adjustable stop 39.

*Operation*

An armature is mounted between the winding head and presser head and the wire threaded thereto all in the usual manner. The slide 34 is then adjusted so that the tooth number representing the desired number of armature coil turns appears through sight opening 36.

With the slide block in proper adjustment, the motor 4 is started and the operator depresses foot pedal 9 drawing motor base 5 downward which tightens belt B (which is normally slack) and retracts pin 48 from the path of lever 28. With the retraction of the pin, the clutch assembly is engaged, the brake assembly is released, and pawl 44 engaged with the ratchet wheel.

The drive or winding head shaft 10 then rotates at relatively slow speed and winds the wire W as a coil on the armature 18. With each rotation of shaft 10, drive cam 24 engages one tooth of wheel 22 and rotates such wheel the peripheral distance represented by such one tooth, the slide block 34 approaching stop 39 until finger 38 finally engages the same. Pawl 44 holds the wheel 22 after the cam 24 escapes each tooth.

Upon engagement of finger 38 and stop 39 and resultant swinging movement of lever 40, the lever 28 is actuated causing immediate disengagement of the clutch and application of the brake. Thus, winding head shaft 10, after the predetermined number of revolutions, stops abruptly and there is no over-running. Likewise, cam 43 has engaged and released pawl 44 permitting spring 25 to return the ratchet wheel to starting position. In order to prevent the lever 40 from swinging back to normal position as slide 34 and finger 38 retract from stop 39 which would permit cam 43 to escape from pawl 44 and stop the wheel prematurely on the return rotation thereof, the operator releases foot pedal 9 the instant that the clutch has been released and the brake applied. This causes pin 48 to block return movement of lever 28 holding the lever 40 and cam 43 in the desired position.

The position of the armature being wound is adjusted after each operation as above and the operation repeated until all the armature coils are wound.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an armature winding machine, a rotatable shaft having an armature winding head on one end thereof, drive means for the shaft, said drive means including a clutch, a ratchet wheel mounted for rotation adjacent the shaft, a cam on the shaft in position to recurringly engage the teeth of the wheel and rotate the wheel a predetermined amount, a pawl engaging the ratchet teeth, to prevent retraction of the wheel as intermittently rotated, a control lever mounted in connection with the clutch, an actuating lever mounted at one end in connection with the control lever and terminating at the other end adjacent the ratchet wheel, a selectively disposed striking member on the wheel adapted to engage and move said other end of the actuating lever after predetermined rotation of the wheel whereby to disengage the clutch, means on the actuating lever arranged to engage and release the pawl upon clutch releasing movement of said actuating lever, and manually controlled means to selectively prevent clutch and pawl reengaging movement of said actuating lever.

2. In an armature winding machine, a rotatable shaft having an armature winding head on one end thereof, disengageable drive means for the shaft, a ratchet wheel actuated in one direction, from the shaft, a normally engaged holding pawl cooperating with the wheel, spring return means associated with the wheel, means actuated from the ratchet wheel to simultaneously release the drive means and the holding pawl after a predetermined number of revolutions of the shaft, and manually controlled means to prevent reengagement of the pawl with the ratchet wheel.

3. In an armature winding machine, a rotatable shaft, an armature winding head on one end of the shaft, drive means for the shaft, a normally engaged clutch between the shaft and said said drive means, a ratchet wheel mounted on an axis parallel to the shaft, an element on the shaft to recurringly engage the teeth of the wheel and rotate the same in one direction a predetermined amount with each complete revolution of the shaft, means tending to rotate the wheel in the opposite direction, a releasable pawl engaging the teeth of the wheel to hold the same against rotation in said opposite direction between recurring rotations thereof in said one direction, clutch disengaging means, a movable member operatively associated with the pawl and clutch disengaging means and adapted when moved in one direction to release the pawl from the wheel and actuate the clutch disengaging means, and a block adjustably mounted on the ratchet wheel in position to thus move the member after a predetermined amount of rotation of the ratchet wheel whereby the latter is free to rotate in the opposite direction to a predetermined starting position.

4. A structure as in claim 3, with releasable means to prevent reengagement of the pawl with the ratchet wheel as the latter rotates in said opposite direction and the block retracts from a member engaging position.

5. In an armature winding machine, a rotatable shaft, an armature winding head on one end of the shaft, drive means for the shaft, a normally engaged clutch between the shaft and said drive means, a ratchet wheel mounted on an axis parallel to the shaft, an element on the shaft to recurringly engage the teeth of the wheel and rotate the same in one direction a predetermined amount with each complete revolution of the shaft, means tending to rotate the wheel in the opposite direction, a releasable pawl engaging the teeth of the wheel to hold the same against rotation in said opposite direction between recurring rotations thereof in said one direction, a clutch throwout lever, a pivoted arm connected at one end to said lever to move the same to a throwout position upon turning of the arm in one direction, an element on the arm to release the pawl and hold the same released with such turning of the arm, a block adjustably mounted on the ratchet wheel to engage and thus move the arm after a predetermined amount of rotation of the ratchet wheel, and releasable catch means acting to hold the lever against return movement when once moved to a clutch disengaging position.

6. A structure as in claim 5, with spring means tending to hold the shaft drive means inoperative, manual means to counteract the holding means, and means between the manual means and the catch means to release the latter upon actuation of the manual means.

RALPH ABRAMS.